United States Patent
Macoit et al.

[11] 3,789,250
[45] Jan. 29, 1974

[54] PERMANENT MAGNET DYNAMOELECTRIC MACHINE

[75] Inventors: Arthur J. Macoit, Riverview; Theodore G. Apostoleris, both of Ann Arbor, Mich.

[73] Assignee: Ford Motor Company, Dearborn, Mich.

[22] Filed: Feb. 4, 1972

[21] Appl. No.: 223,636

[52] U.S. Cl. .................................. 310/154, 310/43
[51] Int. Cl. ........................................... H02k 23/04
[58] Field of Search . 310/154, 152, 40 MM, 43, 46, 310/89, 86, 91, 87, 256, 88, 254

[56] References Cited
UNITED STATES PATENTS

| | | | |
|---|---|---|---|
| 3,521,096 | 7/1970 | Merriam | 310/154 |
| 3,401,281 | 9/1968 | Martin | 310/43 |
| 2,456,701 | 12/1948 | Hansen | 310/154 |
| 2,465,446 | 3/1949 | Gorfin | 310/154 |
| 3,530,320 | 9/1970 | Davidson | 310/86 |
| 3,488,836 | 1/1970 | Wheeler | 310/154 |

FOREIGN PATENTS OR APPLICATIONS

| | | | |
|---|---|---|---|
| 949,477 | 2/1964 | Great Britain | 310/43 |

*Primary Examiner*—R. Skudy

[57] ABSTRACT

A permanent magnet dynamoelectric machine including an armature or rotor and a plastic cup-shaped housing having a substantially cylindrical inner surface portion with means for rotatably supporting the armature or rotor within the substantially cylindrical inner surface of the housing. Four permanent magnets and two ferromagnetic flux path members are mounted in assembled relationship either on the outer surface of the cup-shaped housing or molded within the plastic cup-shaped housing so that plastic material is interposed between the armature or rotor and the permanent magnets.

10 Claims, 6 Drawing Figures

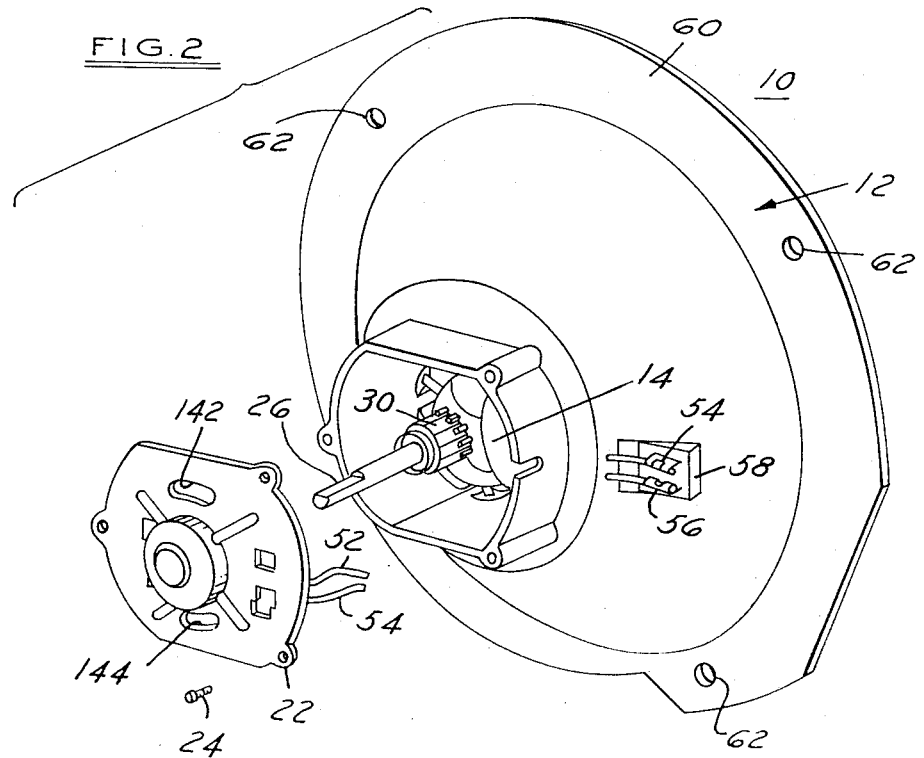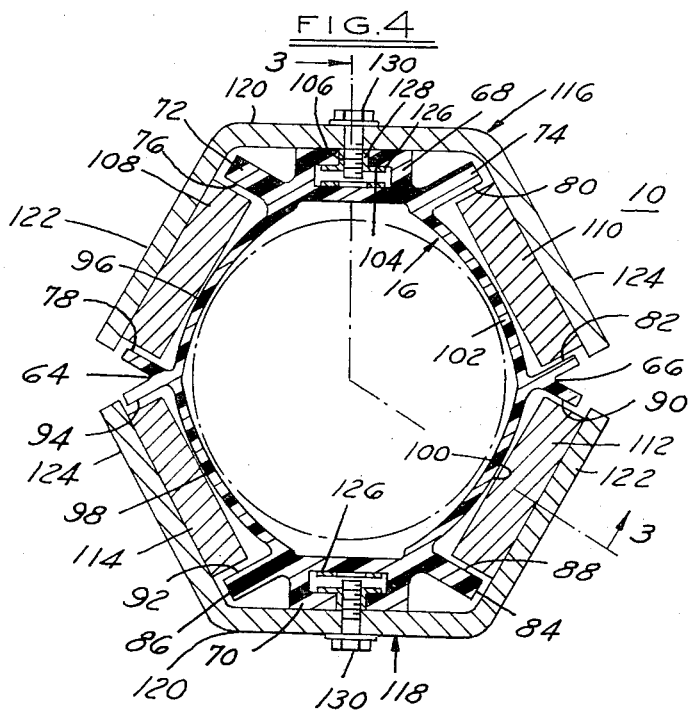

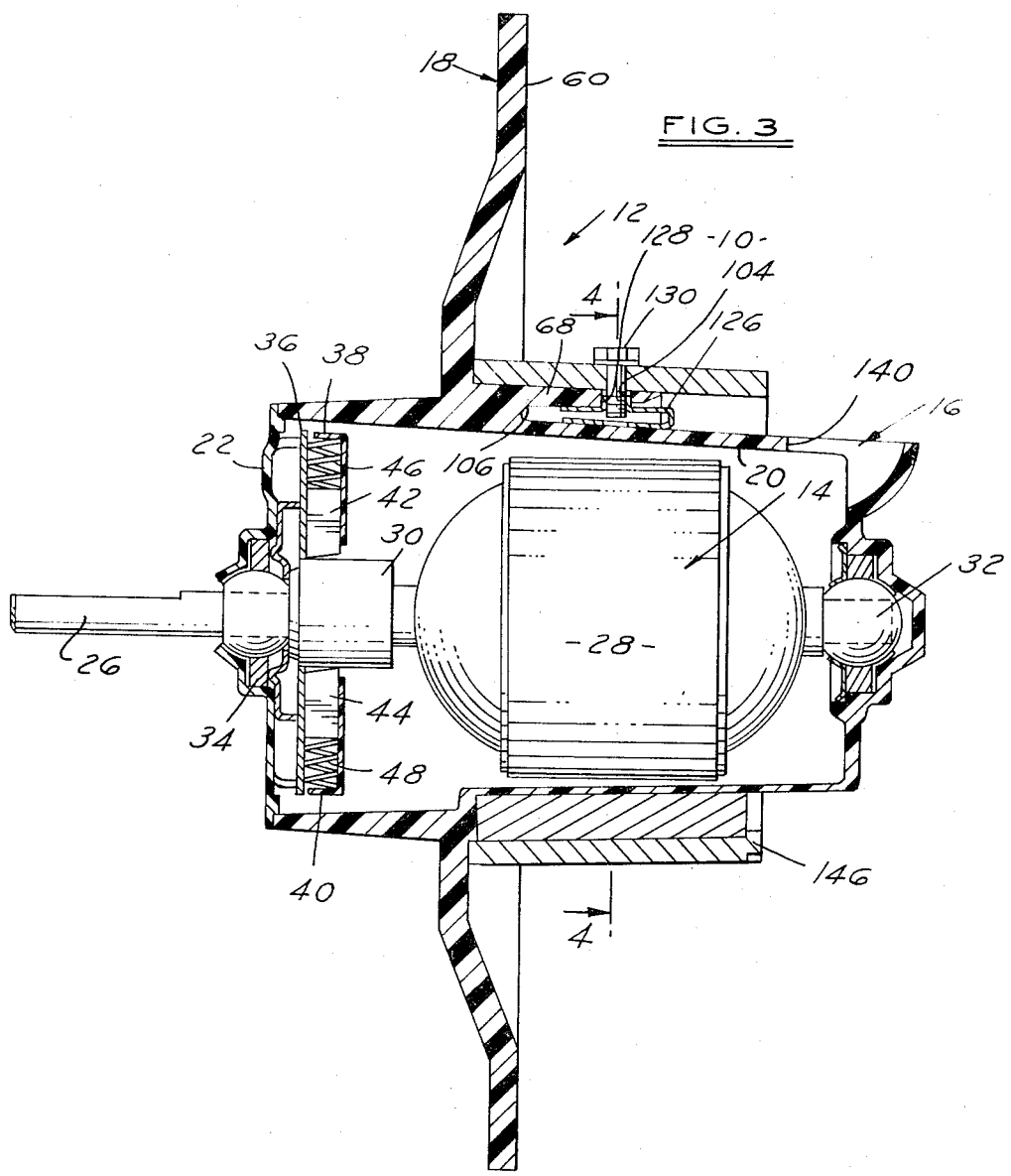

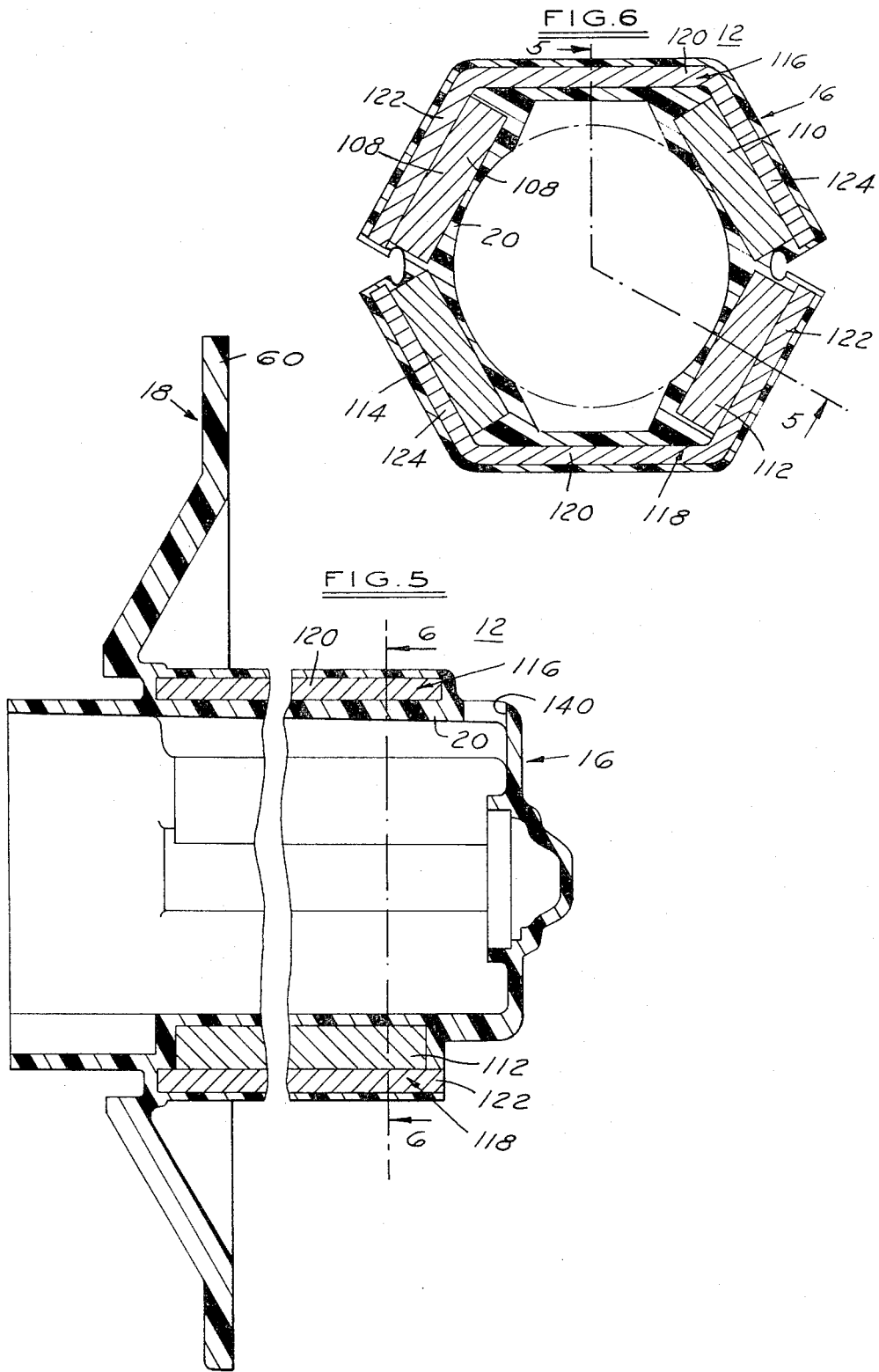

PERMANENT MAGNET DYNAMOELECTRIC MACHINE

BACKGROUND OF THE INVENTION

This invention relates to a permanent magnet dynamo-electric machine and more particularly to a permanent magnet dynamoelectric machine that may be readily employed as a small motor in automotive applications, for example, a heater and air conditioning blower motor or a windshield wiper motor.

It is known in the prior art to construct permanent magnet dynamoelectric machines by using a plurality of flat block permanent magnets which are positioned in engagement with a pair of ferromagnetic flux path members. The flat block permanent magnets and ferromagnetic flux path members are held in engagement by plastic clip means. Such a structure is disclosed and claimed in U.S. Pat. No. 3,521,096, assigned to the assignee of the present invention.

The permanent magnet dynamoelectric machine disclosed in the above mentioned patent has a pair of plastic clip means with receptacles positioned therein for receiving a plurality of flat block permanent magnets which form the field of the machine. A pair of arcuate shaped ferromagnetic flux path members are positioned in engagement with the flat block permanent magnets. These ferromagnetic flux path members have a generally arcuate configuration conforming to the inner surface of the metallic housing which rotatably supports the armature of the machine. This assembly is then press fitted into the housing to properly position the permanent magnets in radial spaced relationship with respect to the armature.

In the above described dynamoelectric machine and in other well known and conventional permanent magnet dynamoelectric machines a radial air gap is provided between the armature and the permanent magnets. In addition, the permanent magnets in all of these machines are positioned within the metallic housing of the machine and in close spaced radial relationship with respect to the armature.

The present invention provides an improvement over the dynamoelectric machine disclosed in U.S. Pat. No. 3,521,096 and described above as well as an improvement over other prior art dynamoelectric machines.

SUMMARY OF THE INVENTION

In the present invention, a permanent magnet dynamo-electric machine is provided which comprises as its field structure a plurality of permanent magnets, for example, four in number, that are preferably of a flat block configuration. Two ferromagnetic flux path members having flat end portions are provided with each of the flat end portions being positioned in engagement with one of the flat block permanent magnets.

The housing or casing for the permanent magnet dynamo-electric machine of the present invention is a molded plastic cup having a substantially cylindrical inner surface with means provided for rotatably mounting the armature of the machine within this cylindrical inner surface. The permanent magnets and the two ferromagnetic flux path members referred to above are positioned on the exterior surface of this plastic cup and means are provided for securing the permanent magnets and the two ferromagnetic flux path members on the exterior surface of the cup. In the alternative, the permanent magnets and the two ferromagnetic flux path members may be molded into the exterior of the molded plastic cup.

As a result of the structure of the dynamoelectric machine of the present invention which has been described briefly above, plastic material is positioned between the armature of the machine and the permanent magnets that provide the field structure. The plastic material employed has substantially the same permeability as that of air and this provides an optimum gap between the armature and the permanent magnets. As a result, substantially less de-magnetizing effect from the armature of the machine is encountered by the permanent magnets. Consequently, a lower coercive force and higher flux density permanent magnet material may be employed. For example, grade 5 and grade 8 permanent magnet ceramic material may be used with the present invention, in place of the more costly grades 4 and 7 permanent magnet ceramic materials. These more costly grades have been employed in the past because they have high coercive forces that prevent de-magnetization of the magnets due to armature reaction de-magnetizing effects.

As stated previously, the housing or casing is formed in a cup shape from a molded plastic material. In one embodiment of the invention, the exterior surfaces of this cup-shaped housing are arcuate in configuration. Means are provided for positioning the flat block permanent magnets on these arcuate surfaces and thus they engage the outer surface of the cup-shaped housing on the line contact. The ferromagnetic flux path members have flat surfaces that engage the flat surfaces of the permanent magnets. This line contact between the permanent magnets and the outer surface of the cup-shaped housing permits the inner surface of each permanent magnet to pivot or rotate about the outer surface of the cup-shaped housing so that the outer surface of the magnet may come into intimate contact with the ferromagnetic flux path member. This structure provides an optimum low reluctance flux path, without the presence of air gaps, between the permanent magnets and the ferromagnetic flux path members.

Positioning of the permanent magnets on or within the exterior of the plastic housing has many advantages. Among these is that there is no heat build-up in the permanent magnets as a result of their being positioned closely adjacent to and in the same housing as the armature or rotor of the machine. With the permanent magnets positioned on the outside of or within the exterior structure of the cup-shaped housing, the armature may be readily cooled by providing an axial air flow through the cup-shaped housing. In addition, no magnetic chips can get into the interior of the housing to interfere with the action of the armature and the commutator and brush arrangement. In addition, with the plastic cup-shaped housing of the present invention and with the permanent magnets and ferromagnetic flux path members mounted on or within the exterior structure of the housing an inherently watertight structure can be provided.

An additional advantage of the present invention is that less permanent magnet material may be employed because, as pointed out above, the structure of the invention permits the use of a high flux density, low coercive force material. Consequently, less ferromagnetic material need be employed for the ferromagnetic flux path members and less conductive wire need be employed in the armature. Additionally, it has been found that a permanent magnet machine constructed in accordance with the principles of this invention is approximately 10 percent less costly than dynamoelectric machines constructed in accordance with the prior art.

Still another advantage of the present invention is that the plastic cup-shaped housing for the dynamoelectric machine can be molded integrally with a mounting flange and this provides for quiter operation of the dynamoelectric machine than those constructed with metallic housing members.

An object of the present invention is the provision of a highly efficient permanent magnet dynamoelectric machine.

Another object of the present invention is the provision of a dynamoelectric machine that employs inexpensive and highly effective permanent magnet material.

A further object of the present invention is the provision of a permanent magnet dynamoelectric machine that is inexpensive and may be readily assembled in a production operation.

Other objects and attendant advantages of the present invention may be more readily realized as the specification is considered in connection with the attached drawings.

BRIEF DESCRIPTION OF THE DRAWINGS

FIG. 2 is an exploded view of the permanent magnet dynamoelectric machine of the present invention taken from a different vantage point than the view of FIG. 1;

FIG. 3 is a sectional view partially in elevation of the permanent magnet dynamoelectric machine of the present invention taken substantially along the lines 3—3 of FIG. 4;

FIG. 4 is a sectional view taken along the lines 4—4 of FIG. 3 with the armature or rotor thereof shown in dotted lines;

FIG. 5 is a sectional view partially in elevation of the stator of another embodiment of the present invention taken along the lines 5—5 of FIG. 6; and FIG. 6 is a sectional view taken along the lines 6—6 of FIG. 5 with the armature or rotor thereof shown in dotted lines.

DESCRIPTION OF THE PREFERRED EMBODIMENT

Figure 1:
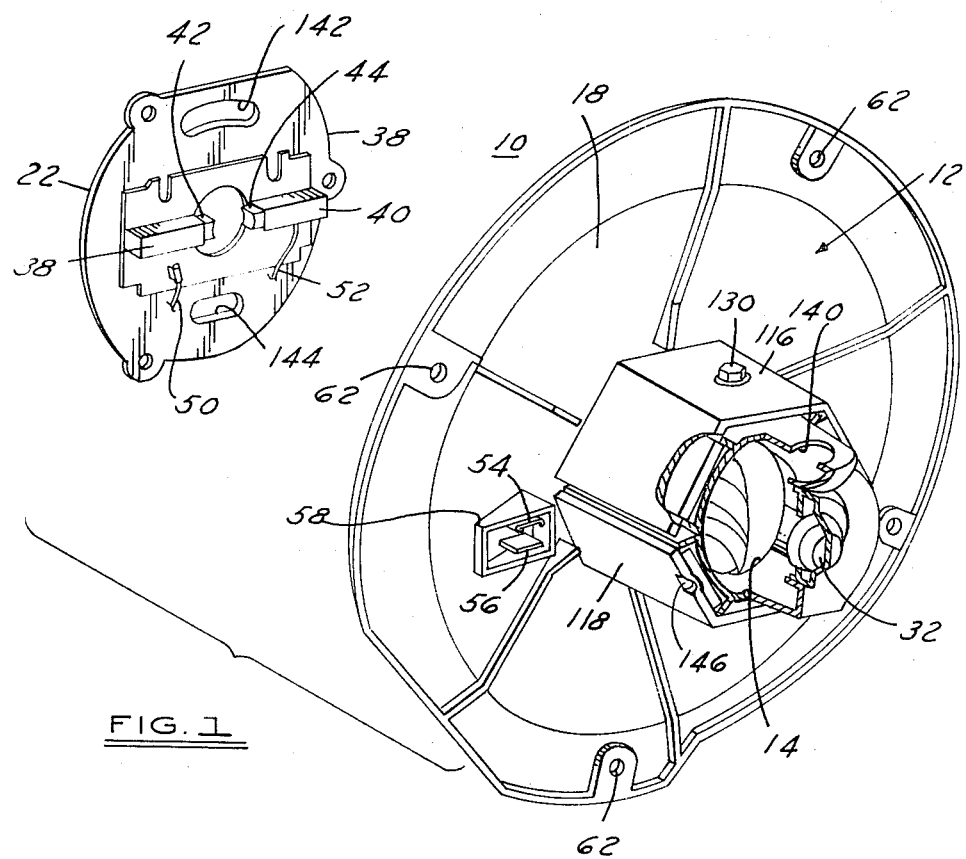
FIG. 1 is an exploded perspective view with portions cut away of one embodiment of the dynamoelectric machine of the present invention.

Referring now to the drawings, there is shown in FIGS. 1 through 3 one embodiment of the permanent magnet dynamoelectric machine 10 of the present invention which has a stator structure 12 and a rotor or armature 14. The stator structure 12 comprises a molded plastic cup-shaped housing 16 having formed integrally therewith a mounting flange 18. The cup-shaped housing 16 has a substantially cylindrical inner surface 20 which may have a lesser diameter at the righthand side as viewed in FIG. 3 than at the lefthand side to permit proper molding procedures. The open end of the cup-shaped housing 16 is closed with an end plate 22 which may be affixed to the end of the cup-shaped housing 16 by a plurality of screws, one of which is shown at 24.

The armature or rotor 14 includes a shaft 26, a winding portion 28 and a commutator 30. A conventional sleeve-type bearing 32 is positioned at one end of the cup-shaped housing and a second conventional sleeve-type bearing 34 is positioned in the end plate 22 for rotatably mounting the shaft 26 of the armature or rotor 14 within the stator 12.

The end plate 22 has a conventional brush card 36 mounted thereon which contains two brush holders 38 and 40 for holding brushes 42 and 44 in engagement with the commutator 30. A pair of compression springs 46 and 48 are employed to bias the brushes 42 and 44 into engagement with the commutator 30. Leads 50 and 52 from the brushes 42 and 44, respectively, have connecting tangs 54 and 56 attached to the ends thereof opposite the brushes 42 and 44 and these are press fitted into a rectangular receptacle 58 formed integrally in the mounting flange 18.

The mounting flange 12 includes a flat portion 60 having a plurality of apertures 62 positioned therein for the reception of mounting bolts which are employed to mount the dynamoelectric machine 10 of the present invention on a suitable support, for example, a support contained in the air conditioning and heater system of an automotive vehicle.

As can be seen most readily by an inspection of FIG. 4, the outer surface of the cup-shaped housing 16 is generally cylindrical in configuration and has two radially extending side projections 64 and 66, as the dynamoelectric machine 10 is viewed in FIG. 4, and another pair of projections 68 and 70 extending from the top and bottom thereof as viewed in FIG. 4. The projection 68 has a pair of tabs 72 and 74 extending at an angle therefrom. The tab 72 has a surface 76 which is generally parallel to a surface 78 on the projection 64 and the tab 74 has a surface 80 which is generally parallel to a surface 82 on the projection 66.

Similarly, projection 70 has a pair of tabs 84 and 86 extending at an angle therefrom. The tab 84 has a surface 88 extending substantially parallel to a surface 90 on projection 66 and the tab 86 has a surface 92 extending generally parallel to a surface 94 on projection 64. Consequently, the outer surface of the cup-shaped housing 16 has a plurality of arcuate-shaped segments or surfaces designated by the numerals 96, 98, 100 and 102 positioned between the projections 68, 64, 70 and 66.

Each of the projections 68 and 70 has an axially extending slot 104 positioned therein with an aperture 106 extending from the outer surface of each projection 68 and 70 into the slot 104.

The field structure for the permanent magnet machine 10 of the present invention comprises a plurality of permanent magnets 108, 110, 112 and 114 which are preferably of flat block configuration and are rectangular in shape. The permanent magnet 108 is positioned between the surface 76 on the tab 72 and the surface 78 on projection 64 and the inner surface thereof is in engagement with the arcuate surface or segment 96 on the outer surface of the cup-shaped housing 16. The other permanent magnets 110, 112 and 114 are similarly positioned between the surfaces 80 and 82, 88 and 90, and 92 and 94, respectively, and have their inner surfaces in engagement with the arcuate segments or surfaces 102, 100 and 98, respectively, on the outer surface of the cup-shaped housing 16.

Each of the permanent magnets 108, 110, 112 and 114 is polarized in a radial direction with respect to the axis of the dynamoelectric machine 12 and the axis of the rotor or armature 14 to provide field poles for the dynamoelectric machine of the present invention. A pair of ferromagnetic flux path members 116 and 118 are provided and each has a body portion 120 and two end portions 122 and 124 positioned at an angle with respect to the body portion 120. A spring steel fastener 126 is employed to affix the main body portion 120 of the ferromagnetic flux path members 116 and 118 to a flat outer surface of projections 68 and 70, respectively. These spring steel fasteners 126 are generally U-shaped in configuration and have an upstanding threaded portion 128 for receiving a bolt 130 that extends through an aperture in the main body portion 120 of each of the ferromagnetic flux path members 116 and 118. It can be readily appreciated that the spring steel fasteners 126 may be inserted into the axially extending slot 104 in each of these projections 68 and 70 and that the threaded portion 128 will snap into the aperture 106 when the spring steel fastener reaches the proper position.

In the assembly of the stator structure 12, the permanent magnet 108 is positioned between tab 72 and projection 64 so that the inner surface thereof, as viewed in FIG. 4, is in line contact with the arcuate segment 96 on the outer surface of the cup-shaped housing 16. Similarly, the other permanent magnets 110, 112 and 114 are positioned between tabs and projections 74 and 66, 66 and 84, 86 and 94, respectively, so that the inner surfaces thereof are in line contact with the arcuate surfaces or segments 102, 100, and 98, respectively, on the outer surface of the cup-shaped housing 16. The ferromagnetic flux path members 116 and 118 are then positioned over the permanent magnets 108, 110, 112 and 114 and over the projection 68 and 70, respectively, on the cup-shaped housing 16. The bolts 130 are then employed in cooperation with fasteners 126 to affix the ferromagnetic flux path members 116 and 118 in position whereby the flat portions 122 and 124 of the flux path member 116 are in engagement with the outer surfaces of the permanent magnets 108 and 110, respectively, and the flat portions 122 and 124 of the ferromagnetic flux path member 118 are in engagement with the outer surfaces of permanent magnets 112 and 114, respectively. It can be appreciated that since the inner surfaces of each of the permanent magnets is in line contact with an arcuate segment on the outer surface of the cup-shaped housing 16 that the permanent magnets may pivot or rock about this line contact to assure that the outer surface of each of the permanent magnets is in intimate contact with the flat portions of the ferromagnetic flux path members 116 and 118. This provides an optimum flux path with the least reluctance between the permanent magnets and the end portions 122 and 124 of the flux path members 116 and 118.

As shown in FIGS. 1 and 3, the cup-shaped housing 16 has an aperture 140 positioned therein for the reception of a conduit which will allow cooling air to be drawn through the inner portion of the cup-shaped housing 16 and over the armature or rotor 14. To facilitate the flow of cooling air the cover plate 22 has a pair of apertures 142 and 144 positioned therein.

Each of the end portions 122 and 124 of each of the ferromagnetic flux path members 116 and 118 has a struck-in tab or detent 146 positioned therein as can best be seen by reference to FIGS. 1 and 3. These struck-in tabs or detents 146 assure that the permanent magnets 108 and 110, 112 and 114 remain in proper axial position on the outer surface of the cup-shaped housing 16.

The cup-shaped housing 16 together with the integral mounting flange 18 may be molded from a polyester resin which is premixed with a 15 percent to 20 percent glass fill. In addition, the permanent magnets 108, 110, 112 and 114 are preferably of the ceramic type and have a high flux density and a low coercive force, for example, grade 5 or grade 8 ceramic permanent magnets may be employed.

Another embodiment of the present invention is shown in FIGS. 5 and 6. In this embodiment of the invention, the stator 12 also includes the cup-shaped housing 16 together with the integrally molded mounting flange 18. In this embodiment of the invention, the permanent magnets 108, 110, 112 and 114 together with the ferromagnetic flux path members 116 and 118 are integrally molded into and are encapsulated in the plastic material of the cup-shaped housing 16. This may be accomplished by placing the permanent magnets 108, 110, 112 and 114 into a suitably designed molding fixture. The ferromagnetic flux path members 116 and 118 are then placed into position so that the end portions 122 and 124 of flux path member 116 engage the outer surfaces of permanent magnets 118 and 110, respectively, while the end portions 122 and 124 of ferromagnetic flux path member 118 engage the outer surfaces of permanent magnets 112 and 114, respectively. An epoxy resin is then poured over this assembly of the permanent magnets and the ferromagnetic flux path members and into a mold which forms the stator structure 12 including the cup-shaped housing 16 and the integral mounting flange 18. The mold is formed so that plastic material is positioned radially inwardly from the permanent magnets 108, 110, 112 and 114 to form a substantially cylindrical inner surface 20 for the reception of the rotor or armature 14 as shown in FIG. 3. Consequently, the inner surfaces of the permanent magnets have plastic material interspersed between these surfaces and the outer surface of the rotor or armature 14, as is the case with respect to the embodiment of the invention shown in FIGS. 1 through 4.

The rotor 14 of the end plate 22 and the remainder of the structure shown in FIGS. 1 through 4 are also employed with the embodiment of the invention shown in FIGS. 5 and 6. In addition, the cup-shaped housing 16 may have the aperture 140 suitably positioned therein to receive a conduit which furnishes a path for cooling air through the interior of the cup-shaped housing 16 and over the rotor or armature 14.

As pointed out previously, with the plastic material of the cup-shaped housing interposed between the armature winding and the magnets at an optimum distance, the de-magnetizing effect of the armature reaction is substantially reduced over known types of permanent magnet motors. This permits the low coercive force, high flux density magnets to be employed which give higher usable flux to the motor and are cheaper than the magnets employed in conventional permanent magnet motors. Consequently, a permanent magnet motor constructed in accordance with the principles of the invention utilizes less magnetic material, less ferromagnetic flux path material and less conductive wire in the armature winding. This results in a permanent magnet motor that is approximately 10 percent cheaper than permanent motors having the same performance characteristics and constructed in accordance with the principles of the prior art.

The present invention also provides a dynamoelectric machine in which the armature operates within a substantially cylindrical volume with the permanent magnets and the ferro-magnetic flux path members positioned outside this enclosed cylindrical volume. As a result, there is little heat exchange between the armature of the permanent magnet motor of the present invention and the field structure including the permanent magnets and the ferromagnetic flux path members. In addition, there are no obstructions to the smooth flow of cooling air across the armature and there is little chance of any magnetic chips or other impurities interfering with the operation of the armature commutator and brush structure and the sleeve bearings that mount the armature or rotor within the cup-shaped housing.

Thus, the present invention provides an extremely efficient, inexpensive and easy to assemble permanent magnet dynamoelectric machine that is particularly useful as a small motor in automotive applications.

We claim:

1. A dynamoelectric machine comprising a stator and a rotor, said stator including a plastic cup-shaped housing, means for rotatably supporting said rotor within said plastic cup-shaped housing, a plurality of high flux, low coercive force permanent magnets, at least two ferromagnetic flux path members, means for holding said permanent magnets and said ferromagnetic flux path members in assembled relationship in said stator, plastic material of said cup-shaped housing interposed between said rotor and said permanent magnets whereby the gap between said permanent magnets and said rotor is optimized to prevent the de-magnetizing effect from the rotor from overcoming the permanent magnets coercive force.

2. The combination of claim 1 in which said permanent magnets are of flat block configuration.

3. The combination of claim 2 in which the exterior of said plastic cup-shaped housing has arcuate surfaces, said plastic cup-shaped housing having means for locating said permanent magnets in line contact with said arcuate surfaces, each of said ferromagnetic flux path members having a pair of flat end portions, one of said flat end portions being positioned in engagement with one surface of said flat block permanent magnets whereby complete contact is assured between said one surface of said flat block permanent magnets and the associated end portion of said ferromagnetic flux path members.

4. The combination of claim 1 in which said means for holding said permanent magnets and said ferromagnetic flux path members in assembled relationship comprises the plastic material of said cup-shaped housing.

5. The combination of claim 4 in which the plastic material of said cup-shaped housing is molded about said permanent magnets and said ferromagnetic flux path members.

6. The combination of claim 5 in which said permanent magnets are of a flat block configuration.

7. A dynamoelectric machine comprising an armature, a cup-shaped housing formed of non-magnetic material and having a substantially cylindrical inner surface portion, and means for rotatably supporting said armature within said substantially cylindrical inner surface of said cup-shaped housing, a plurality of high flux, low coercive force permanent magnets, at least two ferromagnetic flux path members and means for holding said permanent magnets and said ferromagnetic flux path members in assembled relationship exteriorly of said substantially cylindrical inner surface of said cup-shaped housing, non-magnetic material of said cup-shaped housing positioned between said permanent magnets and said armature to form an optimum gap whereby the de-magnetizing force produced by the armature will not overcome the coercive force of the permanent magnets.

8. The combination of claim 7 in which the non-magnetic material of said cup-shaped housing is molded about said permanent magnets and said ferromagnetic flux path members to form said means for holding said permanent magnets and said ferromagnetic flux path members in assembled relationship.

9. The combination of claim 7 in which the exterior of said cup-shaped housing has arcuate surfaces, said cup-shaped housing having means for locating one surface of each of said permanent magnets in line contact with one of said arcuate surfaces, each of said ferromagnetic flux path members having a pair of flat end portions, each of said flat end portions being positioned in engagement with a flat surface of one of said permanent magnets.

10. A stator for a dynamoelectric machine comprising a cup-shaped housing having a plurality of curved exterior surfaces and constructed of a non-magnetic material, a plurality of flat permanent magnets supported by said housing curved surfaces in spaced relationship about the periphery of said housing, and at least two magnetic flux return path members each having a pair of flat end portions, each of said magnetic flux return path members being supported by said housing with said flat end portions in engagement with two of said flat permanent magnets, said cup-shaped housing having non-magnetic material positioned radially inwardly of said permanent magnets cooperating with the magnetic flux return path member to maintain a line contact between the curved surfaces and one side of the flat permanent magnets to provide intimate planar contact between the other sides of the flat permanent magnets and the flat end portions of the magnetic flux return path members.

* * * * *